(No Model.)

H. G. BAKER.
CORN HUSKER.

No. 426,901. Patented Apr. 29, 1890.

WITNESSES
T. W. Fowler,
W. H. Patterson

INVENTOR
Horace Greeley Baker,
by A. H. Evans & Co
Attorneys.

UNITED STATES PATENT OFFICE.

HORACE GREELEY BAKER, OF IRWIN, IOWA, ASSIGNOR TO JAMES K. P. BAKER, OF SAME PLACE.

CORN-HUSKER.

SPECIFICATION forming part of Letters Patent No. 426,901, dated April 29, 1890.

Application filed February 13, 1890. Serial No. 340,235. (No model.)

*To all whom it may concern:*

Be it known that I, HORACE GREELEY BAKER, a citizen of the United States, residing at Irwin, in the county of Shelby and State of Iowa, have invented certain new and useful Improvements in Corn-Huskers, of which the following is a clear, full, and exact description, reference being had to the accompanying drawings, forming part of this specification, in which—

Figure 1:
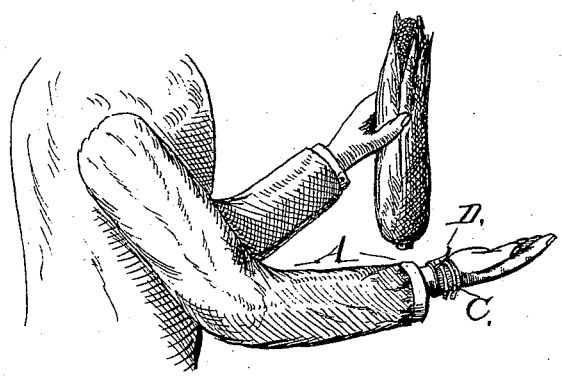
Figure 2:
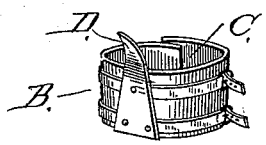

Figure 1 is a perspective view showing my husker in position on the wrist ready for use. Fig. 2 shows the device detached from the wrist.

My present invention relates, generally, to corn-huskers, and has for its object to arrange the hook in such a position on the wrist that by a single movement of the arm the corn-shuck is opened and the hand brought into a proper position to grasp and remove the ear from the stalk.

To enable others skilled in the art to make and use my invention, I will now describe it and indicate the manner in which I carry the same out.

In the drawings, A represents the forearm, and B my husking device in position on the wrist, secured by the strap C, to which is attached the grab-hook D. It is evident that by holding the ear firmly in one hand the operator, to open the husk, has only to press the hook and draw it across the ear, by which single movement the ear is exposed and the hand brought into position to grasp and remove it from the stalk. Thus by one continuous motion and without any change of direction of the arm, wrist, or hand the work is performed to great advantage and with a large saving in time and labor. The wrist-strap C may be made in any desired form and of any suitable material. The grab-hook D is secured rigidly to the wrist-strap, so as to bring the point of the hook on the wrist just above the palm of the hand, as shown in Fig. 1. I have shown this hook as angular or V-shaped, but I do not limit myself to any particular form of hook, the essence of my invention consisting in attaching the hook or peg to the wrist or forearm of the operator, for the purpose of opening or removing the husk from the ear by a single movement of the arm.

Having thus described my invention, what I claim as new, and desire to secure by Letters Patent, is—

A corn-husker consisting of a grab-hook secured to a strap adapted to be worn and used on the forearm or wrist of the operator, substantially as and for the purpose herein set forth.

HORACE GREELEY BAKER.

Witnesses:
JOHN C. NORRIS,
J. K. P. BAKER.